United States Patent
Niessen et al.

(10) Patent No.: US 9,610,718 B2
(45) Date of Patent: Apr. 4, 2017

(54) AUTOMOTIVE SIDE VIEW MIRROR ATTACHMENT ASSEMBLY AND METHOD OF MAKING SAME

(71) Applicant: Ford Global Technologies, LLC, Dearborn, MI (US)

(72) Inventors: Hubert Niessen, Heimbach (DE); Andreas Thiessen, Kreuzau (DE); Michael Meyer, Pulheim (DE); Helmut Olbricht, Wuppertal (DE)

(73) Assignee: Ford Global Technologies, LLC, Dearborn, MI (US)

(*) Notice: Subject to any disclaimer, the term of this patent is extended or adjusted under 35 U.S.C. 154(b) by 8 days.

(21) Appl. No.: 14/735,389

(22) Filed: Jun. 10, 2015

(65) Prior Publication Data

US 2015/0273744 A1    Oct. 1, 2015

Related U.S. Application Data

(62) Division of application No. 13/613,274, filed on Sep. 13, 2012, now Pat. No. 9,079,537.

(30) Foreign Application Priority Data

Sep. 14, 2011    (DE) .................... 10 2011 082 651

(51) Int. Cl.
*B60R 1/00* (2006.01)
*B60R 1/06* (2006.01)
(Continued)

(52) U.S. Cl.
CPC ........ *B29C 45/14631* (2013.01); *B60R 1/006* (2013.01); *B60R 1/06* (2013.01); *B29L 2031/3005* (2013.01); *Y10T 29/4998* (2015.01)

(58) Field of Classification Search
CPC ............. B29C 45/14; B29C 45/14336; B29C 45/14631; B29C 2045/14327; B29C 70/68;
(Continued)

(56) References Cited

U.S. PATENT DOCUMENTS 3,415,709 A * 12/1968 Santangelo ....... B29C 45/14311
156/257
5,576,086 A * 11/1996 Narazaki .............. B29C 37/005
248/300

(Continued)

FOREIGN PATENT DOCUMENTS

CN        1472096 A       2/2004
DE    102008015202 A1 * 11/2008 ......... B29C 37/0085
(Continued)

*Primary Examiner* — Essama Omgba
(74) *Attorney, Agent, or Firm* — Jason C. Rogers; Price Heneveld LLP

(57) ABSTRACT

An automotive side view mirror attachment assembly includes a polymeric outer shell having a metal reinforcement member coupled thereto, wherein the polymeric outer shell forms form closures about connecting features of the metal reinforcement member, so as to provide an operably coupling between the polymeric outer shell and the metal reinforcing member that is secured by independent connection locations that are effective to support an external mirror assembly in multiple dimensions.

13 Claims, 4 Drawing Sheets

(51) Int. Cl.
    *B29C 45/14* (2006.01)
    *B29L 31/30* (2006.01)

(58) Field of Classification Search
    CPC ......... B29C 70/681; B60R 1/006; B60R 1/06; Y10T 29/4998; Y10T 29/49982; Y10T 29/49993
    USPC ........................................................ 264/279
    See application file for complete search history.

(56) References Cited

U.S. PATENT DOCUMENTS

| | | | |
|---|---|---|---|
| 6,109,586 A | 8/2000 | Hoek | |
| 6,260,977 B1 * | 7/2001 | Inagaki | B60R 1/06 359/846 |
| 6,467,917 B1 * | 10/2002 | Lang | B60R 1/0605 359/838 |
| 6,793,358 B2 | 9/2004 | Sakata | |
| 6,916,100 B2 | 7/2005 | Pavao | |
| 7,540,619 B2 | 6/2009 | Henion | |
| 8,336,908 B1 * | 12/2012 | Kalisz | B60R 21/205 280/728.3 |
| 8,632,713 B2 * | 1/2014 | Chang | B32B 27/20 219/121.71 |
| 9,079,537 B2 * | 7/2015 | Niessen | B60R 1/06 |
| 2004/0026592 A1 * | 2/2004 | Okamoto | B60R 1/06 248/475.1 |
| 2007/0165315 A1 | 7/2007 | Proctor | |
| 2012/0094108 A1 * | 4/2012 | Chang | B32B 27/20 428/307.3 |
| 2012/0235009 A1 | 9/2012 | Horie et al. | |
| 2013/0062496 A1 * | 3/2013 | Niessen | B60R 1/06 264/279 |
| 2015/0273744 A1 * | 10/2015 | Niessen | B60R 1/06 264/279 |

FOREIGN PATENT DOCUMENTS

| | | | | |
|---|---|---|---|---|
| GB | | 2009662 A * | 6/1979 | ............. B29C 45/14 |
| JP | WO | 9706975 A1 * | 2/1997 | ............... B60R 1/06 |

* cited by examiner

Fig. 3
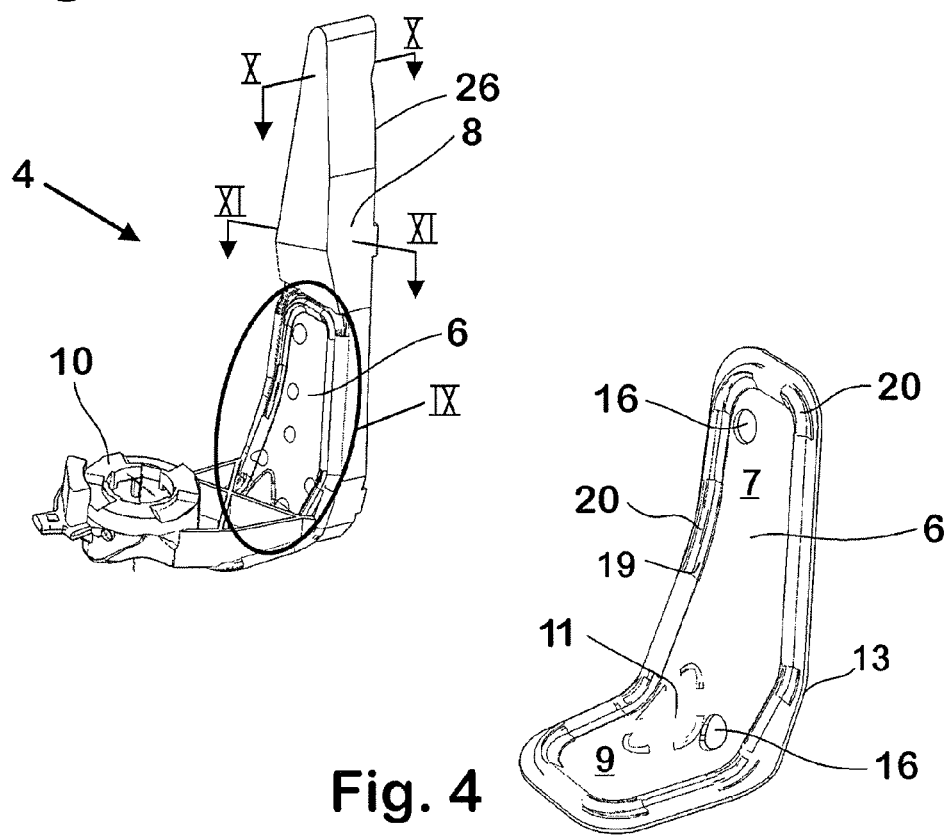
Fig. 4
Fig. 5
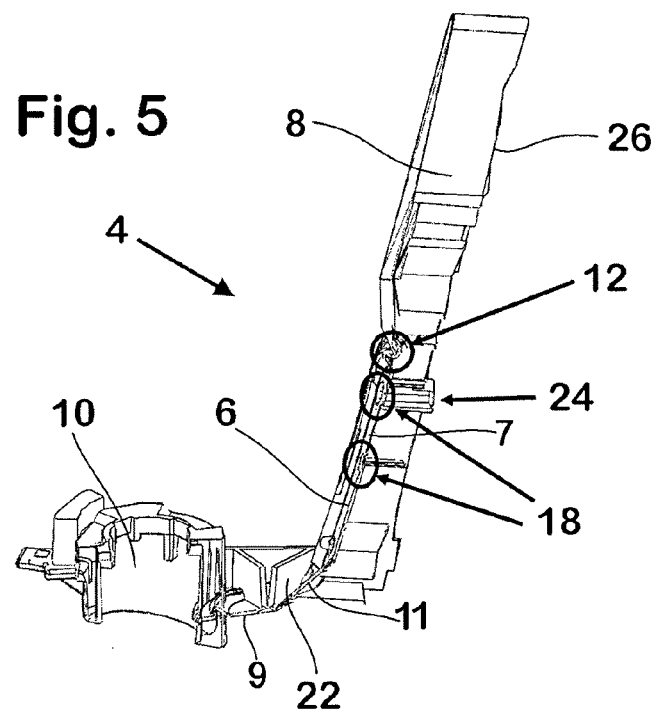

AUTOMOTIVE SIDE VIEW MIRROR ATTACHMENT ASSEMBLY AND METHOD OF MAKING SAME

CROSS-REFERENCE TO RELATED APPLICATION

This application is a divisional of and claims priority to U.S. Pat. No. 9,079,537, issued on Jul. 14, 2015, entitled "AUTOMOTIVE SIDE VIEW MIRROR ATTACHMENT ASSEMBLY AND METHOD OF MAKING SAME," the entire disclosure of which is hereby incorporated herein by reference.

FIELD OF THE INVENTION

The present invention generally relates to an automotive side view mirror attachment assembly and, more specifically, a side view mirror attachment assembly for supporting a side view mirror on a vehicle door, wherein the attachment assembly has a reduced overall weight, yet has sufficient rigidity to minimize mirror vibration in use.

BACKGROUND OF THE INVENTION

Mirror mountings are designed to structurally support a mirror and reduce vibration in use. Full plastic monoblock base brackets have been used in the past, but have not provided the structural stiffness necessary to eliminate visible vibration of the mirror assembly, thereby making the reflected images difficult to see. In order to reduce vibration, an aluminum die cast carrier has been used to rigidify the mirror mounting and provide adequate stiffness for the mirror assembly. Such fully die cast parts are heavy and expensive to produce given the materials used and the overall die casting process. Further, a bulky mirror-mounting structure that may provide sufficient structural rigidity is more likely to cause vibrations during vehicle travel as well as an increase in overall aerodynamic drag.

Mirror attachment assemblies known in the art have used long steel screws as metallic reinforcements for providing the rigidity needed to support an external mirror mount. Further, mirror bases with a carrier element made from a two-layer composite material and an outer layer made from a synthetic material have been used wherein a rigid inner core is made from a material mixture that includes a synthetic material which is injected into the outer layer. The carrier element is then partially encompassed by a synthetic material outer shell. The fully die cast metal mirror bases generally included outer shell components which are non-supporting and provide only visual aesthetic function, rather than any actual supporting functionality.

Thus, there is a desire to provide a mounting assembly for an external side view mirror as mounted on a door panel to fully support the mirror under abusive loading, wherein the mirror mounting assembly provides sufficient rigidity, stiffness and loading performance to reduce vibration in use, and further provides a lower cost and lower weight solution as compared to fully die cast aluminum or ZAMAK mountings. A low cost manufacturing process for making such a mounting assembly is also desired.

SUMMARY OF THE INVENTION

According to one aspect of the present invention, an external mirror mounting assembly for a vehicle includes an outer shell having a vehicle attachment portion and a mirror retaining bracket portion. The vehicle attachment portion and the mirror retaining bracket portion are disposed in a substantially L-shaped configuration, wherein each portion includes one or more connectors. A metal reinforcement element is at least partially covered by the outer shell and includes one or more connecting sites having connecting surfaces. The connectors of the outer shell provide form closures disposed about the connecting surfaces of the connecting sites of the metal reinforcement element and assembly.

Another aspect of the present invention includes an external mounting assembly for a vehicle having a metal reinforcement core with one or more connecting sites disposed thereon, wherein the connecting sites include three-dimensional connecting surfaces. A polymeric shell is coupled to the core and at least partially covers the core. The polymeric shell includes one or more connectors and further comprises a vehicle connecting side and an external mirror support bracket side. The connectors form separate form closures about the connecting surfaces, wherein the form closures are effective in three dimensions.

Yet another aspect of the present invention includes a method of making a hybrid part for an external mirror mounting assembly for a vehicle, wherein the method includes forming a sheet metal reinforcement core, and forming one or more connecting sites on the sheet metal reinforcement core, wherein the one or more connecting sites include connecting surfaces. The method of making a hybrid part further includes inserting the core into an injection molding mold. The method further includes forming a polymeric body by injection molding a polymer material onto the core in the injection molding mold to partially cover the core and enrobe the connecting surfaces with the polymer material to surround and cover the connecting surfaces. The method further includes allowing the polymer material to harden to create localized form closures about the connecting sites of the core and form a hybrid external mirror mounting assembly.

These and other aspects, objects, and features of the present invention will be understood and appreciated by those skilled in the art upon studying the following specification, claims, and appended drawings.

BRIEF DESCRIPTION OF DRAWINGS

In the drawings:

FIG. 3 is a perspective view of a mirror-mounting assembly according to one embodiment, taken from location III, as shown in FIG. 2;

FIG. 4 is a perspective view of a reinforcement member, taken from location IX, as shown in FIG. 3;

FIG. 5 is a cross-sectional view of the mirror-mounting assembly, taken along line X, as shown in FIG. 3;

DETAILED DESCRIPTION OF PREFERRED EMBODIMENTS

Figure 1:
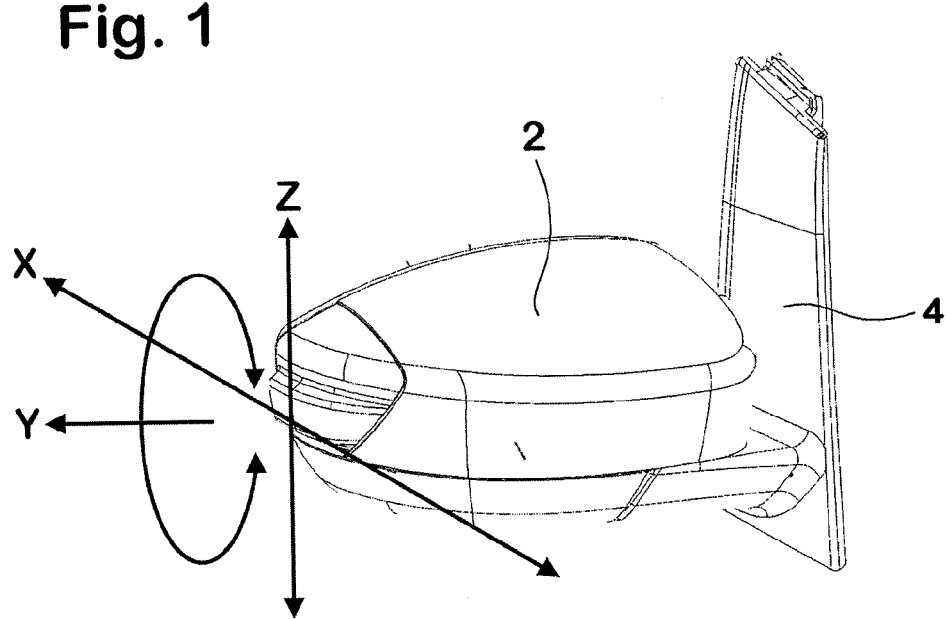
FIG. 1 is a perspective view of a mirror-mounting assembly according to one embodiment.

For the purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in following specification, are simply exemplary embodiments. Hence, specific dimensions and other physical characteristics relating to the embodiments disclosed herein are not to be construed as limiting, unless expressly stated otherwise.

Figure 2:
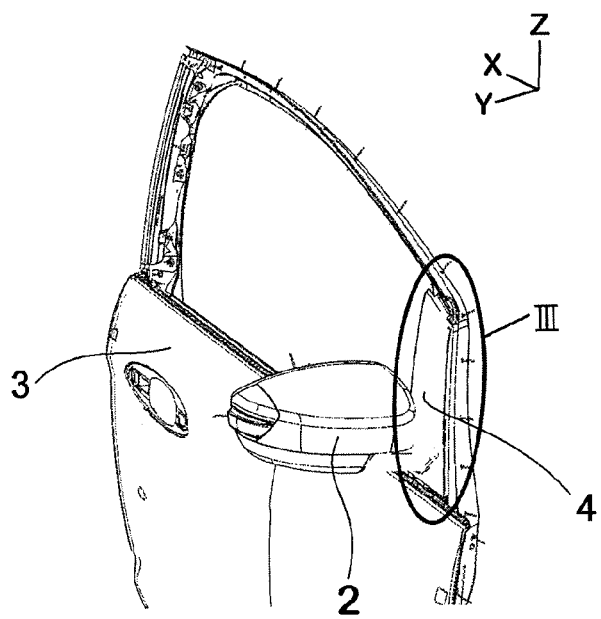
FIG. 2 is a fragmented perspective view of the mirror-mounting assembly of FIG. 1 as coupled to a vehicle door.

Referring now to FIG. 1, an external mirror 2 is shown as supported by an external mirror mounting assembly 4. As shown in FIG. 1, three dimensional axes are indicated including an X-axis, a Z-axis, and a Y-axis. The axes identified in FIG. 1 are generally to be applied to the remaining figures and further help to indicate the different types of vibration that act on an external mirror 2 in use. Specifically, flexure vibration occurs about an X-axis, wherein the X-axis generally includes the longitudinal axis of the vehicle. Torsional vibration occurs about a Z-axis, wherein the Z-axis generally represents the vertical axis of the vehicle. Torsional vibration also occurs about a Y-axis, wherein the Y-axis generally includes the transverse axis of the vehicle. As shown in FIG. 2, the external mirror 2 is shown mounted to a vehicle door 3 as supported by the external mirror mounting assembly 4.

Referring now to FIG. 3, the external mirror mounting assembly 4 is shown having an outer shell 8, which is a polymeric shell comprised in a polymeric body formed by an injection molding process or an extrusion process as further described below. The polymeric body 8 includes a vehicle attachment side 26 and a mirror retaining bracket portion 10, such that the polymeric outer shell 8 has a generally L-shaped configuration. In this configuration, the vehicle attachment side 26 generally runs along the Z-axis, and the mirror retaining bracket portion 10 generally runs along the Y-axis as indicated in FIG. 1. As shown in FIG. 3, the polymeric outer shell 8 further includes a transition location indicated by location IX. As further shown in FIG. 3, a sheet metal reinforcement part or core 6 is disposed at the transition portion IX of the polymeric outer shell 8. Throughout the disclosure, the metal reinforcing part may be referred to as a core, an element, a part, or a member, but it will be understood by one of ordinary skill in the art that the reinforcing element 6 is generally a sheet metal part as shown in FIG. 4.

In assembly, the sheet metal reinforcement element 6 is adapted to reinforce the polymeric outer shell 8 at the transition area IX where the greatest loadings occur on the external mounting assembly 4. It is noted that the metal reinforcement element 6 does not support the polymeric outer shell 8 along the entirety of the vehicle attachment side 26 and the mirror retaining bracket portion 10, but rather the metal reinforcement element 6 reinforces the polymeric outer shell 8 at the transition portion IX only, thereby providing the rigidity the polymeric outer shell 8 requires to support a mirror assembly, such as mirror assembly 2 shown in FIG. 1, while also reducing the overall weight of the assembly 4 as compared to a reinforcement element disposed along the entirety of the polymeric outer shell 8.

As shown in FIG. 4, the metal reinforcement element 6 includes a first portion 7 generally disposed along the Z-axis and a second portion 9 generally disposed along the Y-axis. Again, the axes noted throughout this disclosure are referring to the axes as depicted in FIG. 1. A transition portion 11 is disposed between the first and second portions. In assembly, it is noted that the first portion 7 is generally disposed along a portion of the vehicle attachment side 26 of the polymeric outer shell 8. The second portion 9 of the metal reinforcement element 6 is generally coupled to and supports the mirror retaining bracket portion 10 of the polymeric outer shell 8. Again, it is noted that the first and second portions 7, 9 of the reinforcement element 6 do not fully extend the length of the vehicle attachment side 26 and the mirror retaining bracket portion 10 of the polymeric outer shell 8. As further shown in FIG. 4, the reinforcement element 6 includes a plurality of reinforcement ribs or ridges 20 which are welded, embossed or otherwise formed on the reinforcement member 6, and generally extend along a periphery or outer edge 13 of the reinforcement element 6. As shown in FIG. 4, the reinforcement element 6 further includes connecting sites in the form of apertures 16 which have connecting surfaces 17, as shown in FIG. 7a, which are conically shaped beveled surfaces for providing form closures between the reinforcement element 6 and the polymeric outer shell 8 that are effective in three dimensions as further described below.

Referring now to FIG. 5, the external mirror mounting assembly 4 is a hybrid part comprising a synthetic or polymeric outer shell 8 and a sheet steel plate 6 incorporated therein as a reinforcing member. The sheet metal part 6 is a preformed sheet metal part that can be produced by a number of forming processes including, but not limited to, a stamping process or a cutting process. Once the preformed sheet metal part 6 is prepared, it is coated with a synthetic polymeric material suitable for use in an injection molding or extrusion process. The injection molded process creates the polymeric outer shell 8 of the external mirror mounting assembly 4 such that the polymeric outer shell 8 couples to the preformed sheet metal part 6 at connection sites, such as ridges 20 and apertures 16 shown in FIG. 4. In assembly, as shown in FIG. 5, the polymeric outer shell 8 of the external mirror mounting assembly 4 is reinforced by the sheet metal part 6, but also provides a supporting function for the mirror 2 as shown in FIG. 1. In this way, the polymeric outer shell 8 also has a supporting function rather than a substantially visual function only. Generally, mirror bases made completely of synthetic material provide a visual function as well as a supporting function that has insufficient rigidity. The polymeric outer shell 8 of the present invention provides a visual function as well as a supporting function that is reinforced by the metal reinforcement element 6 in assembly.

Figure 6:
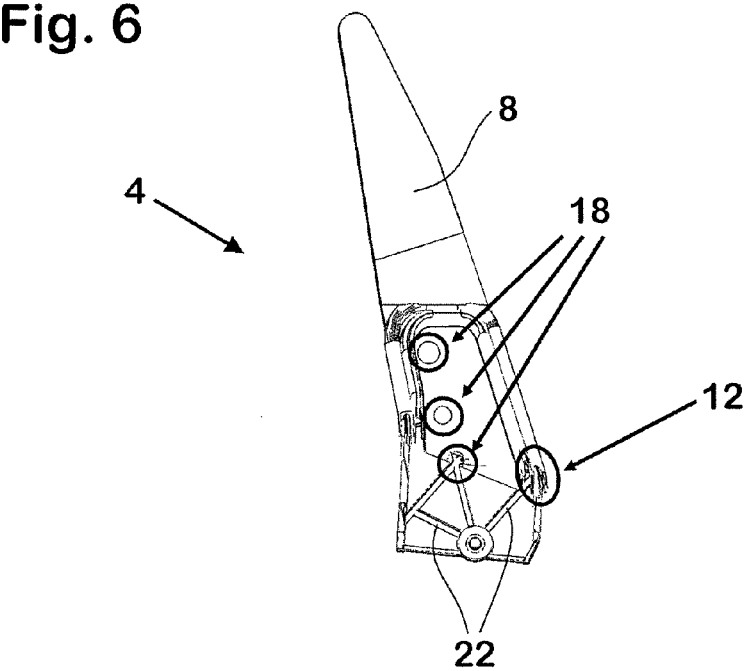
FIG. 6 is a cross-sectional view of the mirror-mounting assembly, taken along line XI, as shown in FIG. 3.
Figure 6A:
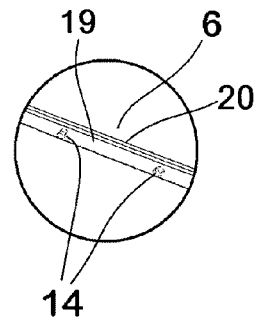
FIG. 6a is a fragmentary perspective view of an edge portion of a reinforcement member having connecting embossments.
Figure 7A:
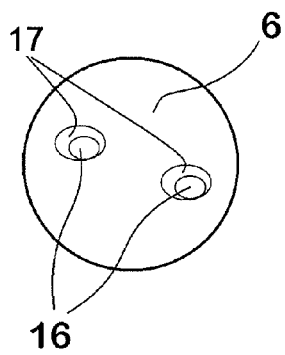
FIG. 7a is a fragmentary perspective view of an edge portion of a reinforcement member having coupling apertures disposed thereon.
Figure 8:
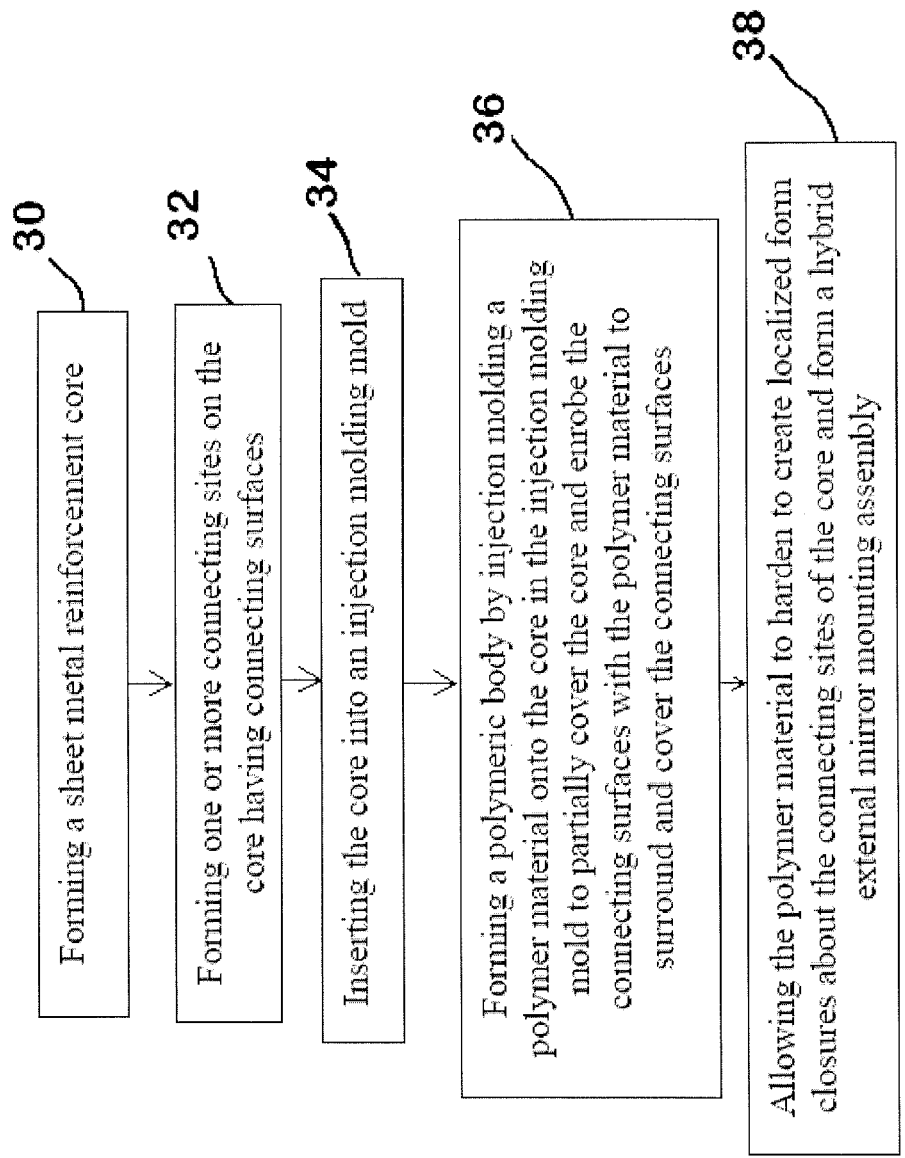
FIG. 8 is a block diagram showing a forming process for one embodiment of the present invention.

In forming the polymeric outer shell about the preformed sheet metal part or reinforcement element 6, the sheet metal reinforcement core 6 is formed having one or more connection sites 16, 20 which have connecting surfaces 17, 19 respectively as shown in FIGS. 6a and 7a. Once formed, the sheet metal reinforcement core 6 is inserted into an injection molding mold much like a cone insert, wherein the injection molding mold or tool has a corresponding shape relative to the desired polymeric outer shell 8. A polymeric body 8 is formed by injection molding a polymer material onto the core 6 as disposed in the injection molding mold. The polymeric material partially covers the core and enrobes the connecting surfaces 17, 19 with the polymer material to surround, penetrate and/or cover the connecting surfaces 17, 19 of the sheet metal reinforcement core. The polymer material is then allowed to harden to create localized form closures about the connecting sites 16, 20 of the metal reinforcement core 6 and thereby form a hybrid external mirror mounting assembly 4. As used throughout this description, the term "form closure" indicates a synthetic material enrobing or surrounding a contact or connecting surface of a connection site, such that the synthetic material seals around a connecting site on the metal reinforcement element 6. Such closures are effective in all three dimensions as they completely surround the connecting surfaces of the metal reinforcement element 6. The pertinent steps in the method of making the hybrid external mirror mounting assembly 4 are found in FIG. 8 as indicated by reference numerals 30, 32, 34, 36 and 38.

As shown in FIG. 5, protrusions or synthetic material strips 12 are formed during the injection molding process in forming the polymeric outer shell 8 which engage a plurality of mutually separate connecting sites, such as connecting sites in the form of ridges 20 shown in FIG. 4 or apertures 16 shown in FIG. 7a, such that the material strips 12 enrobe or cover the ridges 20 of the sheet metal part 6 and lie closely to the connecting surface 19 of the ridges 20.

As shown in FIGS. 3 and 5, and as noted above, the metal reinforcement element 6 is not completely enrobed or covered by the synthetic material of the polymeric outer shell 8. A complete enrobing or covering would produce a generally form closure or jacketing between the two materials. In the present invention, the steel reinforcement element 6 is connected to the polymeric outer coating 8 in a localized positive locking manner at a plurality of mutually separate connecting sites in such a manner that each individual form closure about each connecting site provides a locking arrangement which is effective in all three dimensional directions. As noted above, the dimensional directions are indicated in FIG. 1. The connecting sites, such as connecting sites 16 and 20 shown in FIG. 4, are coupled by protrusions, plugs or strips 12 and 18 formed of polymeric material to affect a locking arrangement in all three dimensional directions. It is noted that an affective locking arrangement in all three dimensional directions means that the contact surfaces, such as contact surfaces 17 and 19 shown in FIGS. 4 and 7a, provide three-dimensional features which the polymeric material of the polymeric outer shell can enrobe or lie closely thereon. In this way, an affective locking arrangement is achieved in all three dimensional directions, such that the mirror assembly 2, as shown in FIG. 1, is rigidly retained and supported against both flexure and torsional vibrations.

Figure 7B:
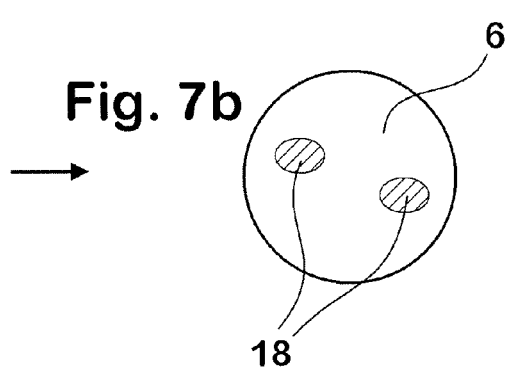
FIG. 7b is a fragmentary perspective view of the edge portion of the reinforcement of FIG. 7a having synthetic material disposed through the coupling apertures.

Referring now to FIG. 6, apertures or holes 16 formed in the metal reinforcement element 6 are filled with a synthetic material 18, as shown in FIGS. 6 and 7b such that the synthetic material 18 forms a plug which is injection molded through the aperture and lies closely on the conical or beveled contact surface 17 of the apertures 16, as shown in FIGS. 7a and 7b. As further shown in FIG. 6, the polymeric outer shell 8 may further include reinforcement ribs 22 which are comprised of a synthetic material formed during the injection molding process. The reinforcement ribs 22 can connect to various connecting sites such as protrusions 12 and plugs 18. The reinforcement ribs 22 can also lie against an edge of the metal reinforcement element 6 such that the metal reinforcement element 6 is supported directly on the reinforcement ribs 22 as shown in FIGS. 5 and 6. As shown in FIG. 5, a fastener receiving boss portion 24 is disposed on the vehicle attachment side 26 of the polymeric outer shell 8 for accepting a fastener to connect the external mirror mounting assembly to a vehicle. It is contemplated that the reinforcement ribs 22 can also connect a protrusion or strip 12 to the fastener receiving boss 24 to provide structural rigidity thereto and help carry loads to the vehicle door.

Figure 6B:
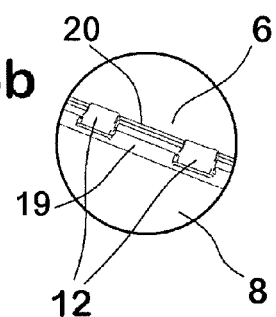
FIG. 6b is a fragmentary perspective view of the edge portion of the reinforcement member shown in FIG. 6a having synthetic connectors coupled thereto.

Further, it is noted that each connection site formed on the metal reinforcement element 6 bonds to the polymeric material of the polymeric outer shell 8 in such a manner that a localized three-dimensional structure of the sheet metal part is either penetrated or encompassed by the synthetic material of the outer shell 8. Referring now to FIGS. 6a and 6b, the localized three-dimensional structures of the metal reinforcing element 6 can be aperture 16 having beveled surfaces 17, or they may further comprise embossed areas 14 as shown in FIG. 6a. As shown in FIG. 6b, strips 12 have fully encompassed or enrobed the embossed portions 14 disposed on the sheet metal part 6 such that localized positive form closures are formed between the metal reinforcing element 6 and the polymeric outer shell 8 as shown in FIG. 6b.

Thus, the present invention provides a polymeric outer shell 8 that is reinforced by a metal reinforcing element 6, such that a hybrid part 4 is formed for supporting an external mirror on a vehicle. The hybrid mirror mounting assembly 4 provides more rigidity in supporting an external mirror as compared to a fully polymeric mirror mounting assembly. Further, the hybrid mirror mounting assembly 4 of the present invention provides a lower weight solution as compared to a fully die cast aluminum mirror mounting assembly having a polymeric outer shell. Having the metal reinforcing element 6 strategically placed at the transition portion IX, shown in FIG. 3, of the external mounting assembly 4, the overall size of the metal reinforcing element 6 is specifically tailored and limited to provide an overall savings in weight of the structure, while still providing the stiffness or rigidity needed to support a mirror assembly in such as manner as to abate visible mirror vibrations that occur during vehicle use.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A method of making a hybrid external mirror mounting assembly for a vehicle, the method comprising the steps of:
    forming a reinforcement core;
    forming one or more connecting sites through the reinforcement core, wherein each of the one or more connecting sites include interior connecting surfaces;
    inserting the reinforcement core into an injection molding mold;
    forming a polymeric shell by injection molding a polymer material onto the reinforcement core in the injection molding mold to partially cover the reinforcement core and enrobe the interior connecting surfaces with the polymer material to surround and cover the interior connecting surfaces of the connecting sites of the reinforcement core; and allowing the polymer material to harden to create localized form closures about the connecting sites of the reinforcement core to form a hybrid external mirror mounting assembly.

2. The method of claim 1, wherein the step of forming a reinforcement core further includes the step of forming the reinforcement core from sheet metal, such that the reinforcement core includes a first portion disposed along a first axis and a second portion disposed along a second axis with a transition portion formed therebetween.

3. The method of claim 2, wherein the step of forming a polymeric shell further includes the step of forming a polymeric shell having a vehicle attachment side and a mirror retaining bracket portion and further including coupling the first portion of the reinforcement core to the vehicle attachment side of the polymeric shell and coupling the second portion of the reinforcement core to the mirror retaining bracket portion of the polymeric shell.

4. The method of claim 2, wherein the step of forming one or more connecting sites through the reinforcement core includes the step of forming one or more apertures on the first and second portions of the reinforcement core, the one or more apertures having beveled interior connecting surfaces disposed around the one or more apertures.

5. The method of claim 4, wherein the step of forming a polymeric shell further includes the step of forming a polymeric shell having a vehicle attachment side and a mirror retaining bracket portion and further including coupling the first portion of the reinforcement core to the vehicle attachment side of the polymeric shell at the one or more apertures formed on the first portion of the reinforcement core, and further coupling the second portion of the reinforcement core to the mirror retaining bracket portion of the polymeric shell at the one or more apertures formed on the second portion of the reinforcement core.

6. A method of making a hybrid external mirror mounting assembly for a vehicle, the method comprising the steps of:
    forming a reinforcement core;
    forming one or more connecting sites through the reinforcement core, wherein each of the one or more connecting sites include interior connecting surfaces;
    inserting the reinforcement core into an injection molding mold;
    forming a polymeric shell by injection molding a polymer material onto the reinforcement core in the injection molding mold to partially cover the reinforcement core; and
    allowing the polymer material to harden to create localized form closures on the interior connecting surfaces of the connecting sites of the reinforcement core to form a hybrid external mirror mounting assembly.

7. The method of claim 6, wherein the step of forming a reinforcement core further includes:
    forming a metal reinforcement core having a first portion disposed along a first axis;
    forming a second portion disposed along a second axis; and
    forming a transition portion disposed between the first and second portions.

8. The method of claim 7, wherein the step of forming one or more connecting sites on the reinforcement core further includes:
    forming one or more connecting sites on the first portion of the metal reinforcement core.

9. The method of claim 7, wherein the step of forming one or more connecting sites on the reinforcement core further includes:
    forming one or more connecting sites on the second portion of the metal reinforcement core.

10. The method of claim 7, wherein the step of forming one or more connecting sites on the reinforcement core further includes:
    forming one or more connecting sites on both the first and second portions of the metal reinforcement core.

11. The method of claim 10, wherein the step of forming one or more connecting sites on the reinforcement core further includes:
    forming one or more connecting sites on the transition portion of the metal reinforcement core.

12. The method of claim 11, wherein the step of forming a polymeric shell further includes:
    forming a polymeric shell having a vehicle attachment side and a mirror retaining bracket portion; and
    coupling the first portion of the metal reinforcement core to the vehicle attachment side of the polymeric shell at the one or more connecting sites formed on the first portion of the reinforcement core, and further coupling the second portion of the reinforcement core to the mirror retaining bracket portion of the polymeric shell at the one or more connecting sites formed on the second portion of the metal reinforcement core.

13. The method of claim 12, wherein the step of coupling the first and second portions of the metal reinforcement core to the polymeric shell further includes:
    enrobing the interior connecting surfaces of the one or more connecting sites of the first and second portions with the polymeric material.

* * * * *